United States Patent
Haramura

(10) Patent No.: US 12,248,701 B2
(45) Date of Patent: Mar. 11, 2025

(54) MEMORY SYSTEM AND METHOD OF CONTROLLING TRANSMISSION OF PACKETS

(71) Applicant: Kioxia Corporation, Tokyo (JP)

(72) Inventor: So Haramura, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/980,059

(22) Filed: Nov. 3, 2022

(65) Prior Publication Data
US 2023/0342075 A1    Oct. 26, 2023

(30) Foreign Application Priority Data
Apr. 26, 2022   (JP) ................... 2022-072506

(51) Int. Cl.
*G06F 3/06*    (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 3/0659; G06F 3/061
See application file for complete search history.

(56) References Cited

U.S. PATENT DOCUMENTS

| | | | |
|---|---|---|---|
| 5,664,145 A * | 9/1997 | Apperley | G06F 3/0601 710/52 |
| 9,032,165 B1 * | 5/2015 | Brooker | G06F 3/0685 711/154 |
| 2010/0312928 A1 * | 12/2010 | Brownell | G06F 13/387 710/57 |
| 2017/0091108 A1 | 3/2017 | Arellano et al. | |
| 2017/0147517 A1 * | 5/2017 | Chen | G06F 13/4282 |
| 2019/0229901 A1 | 7/2019 | Elbaz et al. | |
| 2021/0109681 A1 | 4/2021 | Gissin et al. | |
| 2023/0050525 A1 * | 2/2023 | Hyman | G06F 21/6227 |
| 2023/0266917 A1 * | 8/2023 | Choe | G06F 12/0868 |

* cited by examiner

*Primary Examiner* — Charles Rones
*Assistant Examiner* — Alexander Vinnitsky
(74) *Attorney, Agent, or Firm* — Maier & Maier, PLLC

(57) ABSTRACT

According to one embodiment, a memory system includes a buffer, a nonvolatile memory and a controller. The buffer is capable of storing packets up to a first upper limit number. The controller generates a packet related to access to the nonvolatile memory and stores the packet in the buffer. The controller classifies the packets into packets of a first type and packets of a second type. The number of packets of the second type allowed to be stored in the buffer is limited to a second upper limit number smaller than the first upper limit number. When the number of packets of the second type stored in the buffer is the second upper limit number or larger, the controller does not generate a second packet of the second type or does not store the second packet in the buffer.

18 Claims, 10 Drawing Sheets

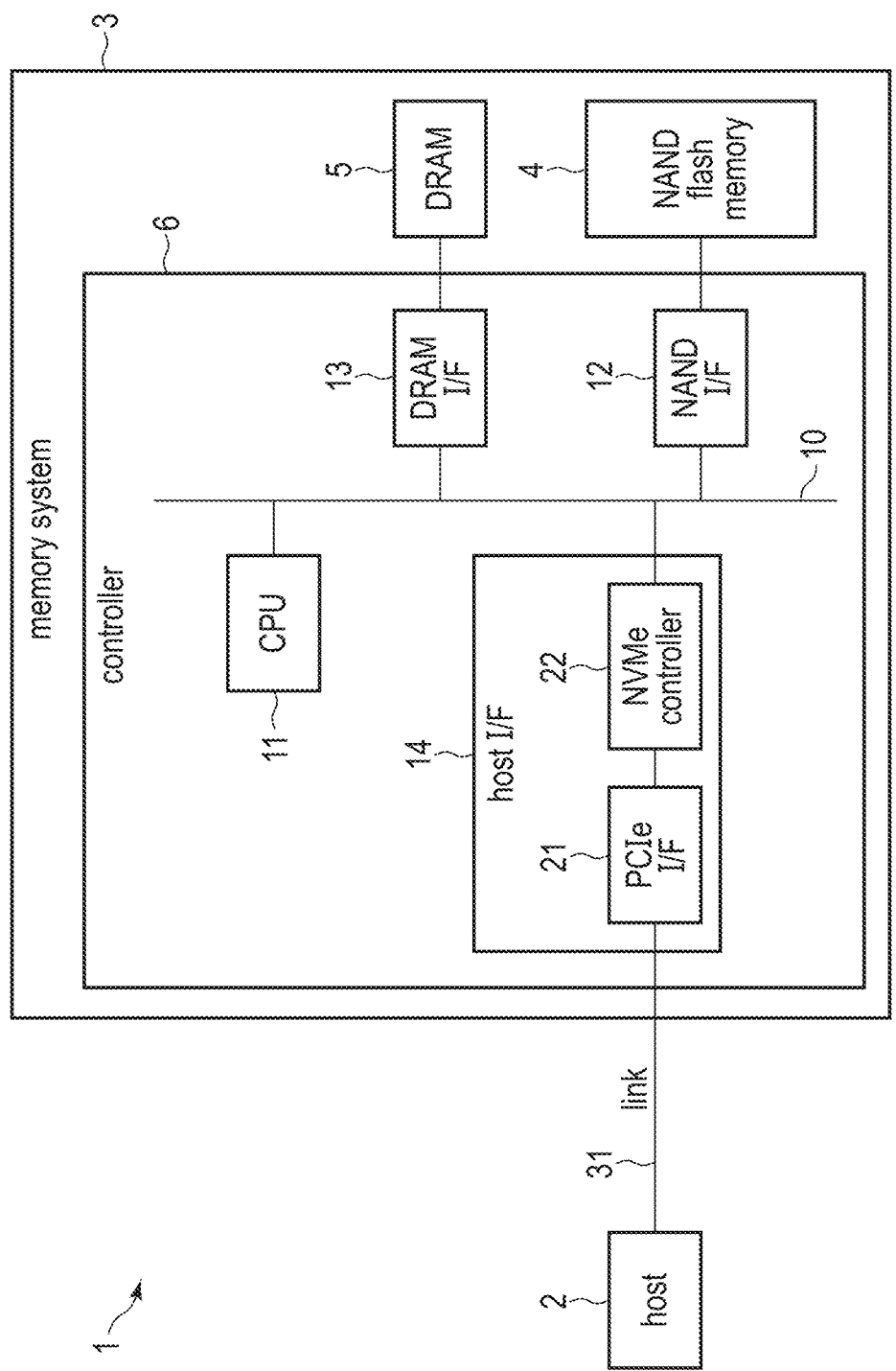
F I G. 1

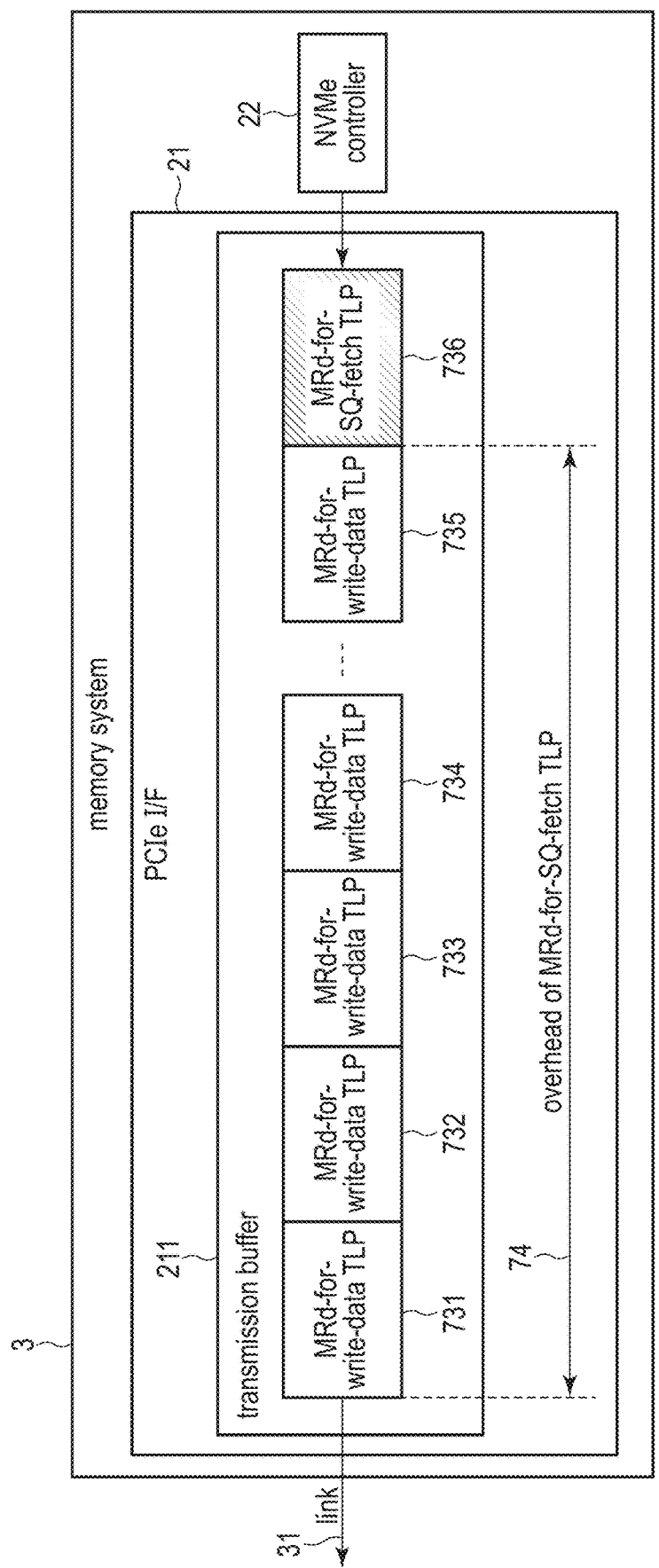
F I G. 5

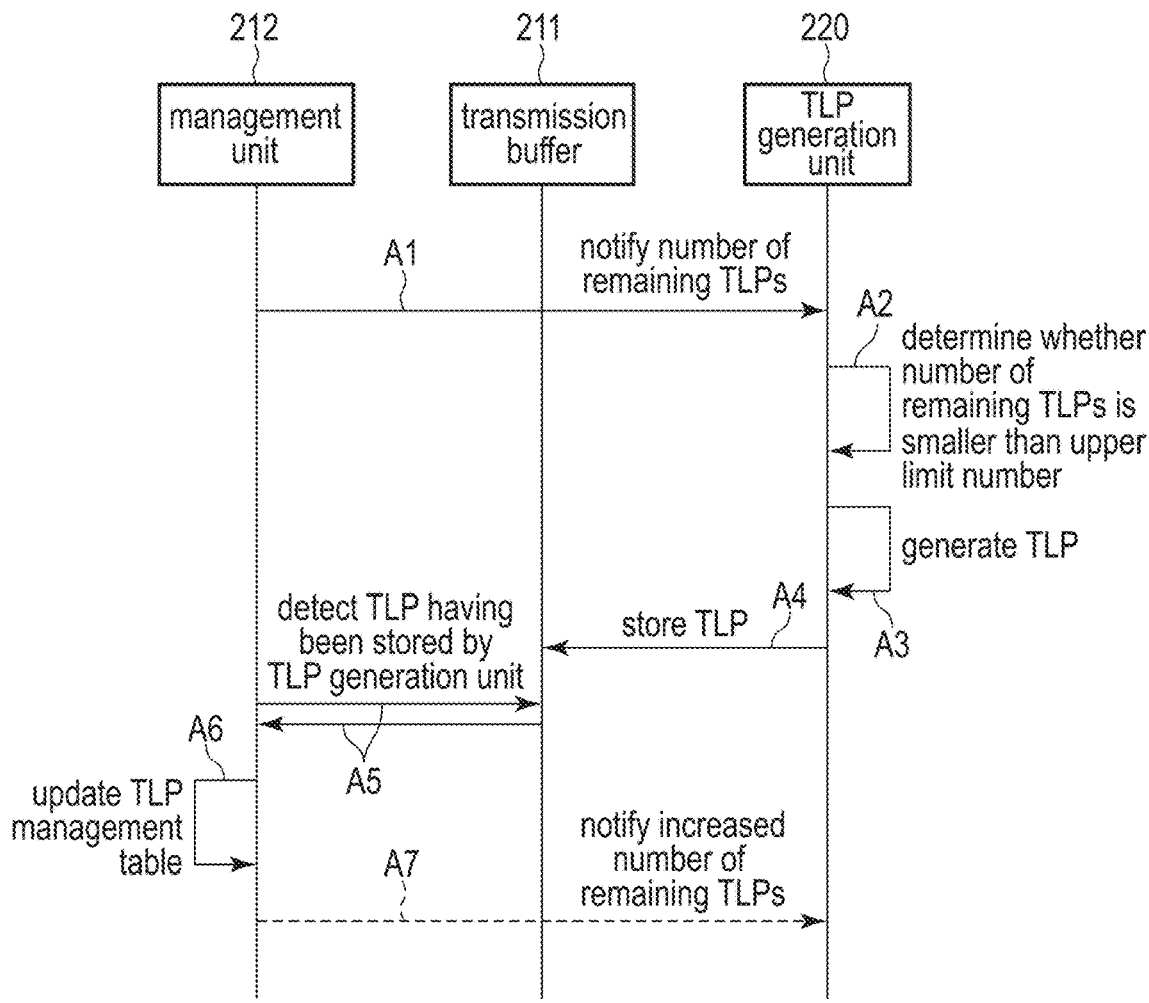
F I G. 7
F I G. 8

| TLP type | number of remaining TLPs | sequence number | |
|---|---|---|---|
| MRd for SQ fetch | 1 | 9 | ~51 |
| MWr for CQ entry | 0 | | ~52 |
| MWr for read data | 5 | 1,2,3,4,5 | ~53 |
| MRd for write data | 3 | 6,7,8 | ~54 |
| ⋮ | ⋮ | ⋮ | |

MEMORY SYSTEM AND METHOD OF CONTROLLING TRANSMISSION OF PACKETS

CROSS-REFERENCE TO RELATED APPLICATIONS

This application is based upon and claims the benefit of priority from Japanese Patent Application No. 2022-072506, filed Apr. 26, 2022, the entire contents of which are incorporated herein by reference.

FIELD

Embodiments described herein relate generally to a technique for controlling a nonvolatile memory.

BACKGROUND

The PCI Express (PCIe) (registered trademark) standard is known as one of the interface standards for connecting a host and a memory system. With an interface conforming to the PCIe standard, the host and the memory system are connected via a transmission path that is referred to as a link. Over the link, data is transferred using a packet. The data transferred using the packet includes, for example, a command from the host to the memory system, a response from the memory system to the host, or user data.

A packet to be transmitted from the memory system to the host is stored in a buffer in the memory system. When multiple packets are stored in the buffer, the packets are transmitted to the host in the order in which the packets have been stored in the buffer. That is, a packet is transmitted after all packets already stored in the buffer at the time the packet was stored have been transmitted to the host. Therefore, the time period required to transmit the packets already stored in the buffer is an overhead incurred when the packet subsequently stored is transmitted to the host.

The host transmits a response (e.g., command) to the memory system in reply to a certain type of packet (e.g., packet requesting a command) transmitted from the memory system. As the overhead in transmitting such a packet from the memory system is greater, the time period that elapses before the memory system obtains the response to the packet is delayed longer. In that case, the memory system may obtain, for example, a reduced number of commands from the host in a unit period of time. If the number of commands that request access to a nonvolatile memory and are obtained from the host in the unit period of time is reduced, the access performance to the nonvolatile memory may be degraded.

BRIEF DESCRIPTION OF THE DRAWINGS

FIG. 1 is a block diagram illustrating an example of a configuration of an information processing system that includes a memory system according to an embodiment.

FIG. 5 is a diagram illustrating another example of an overhead of a TLP to be transmitted to the host from the memory system according to the embodiment.

FIG. 7 is a sequence diagram illustrating an example of a TLP storage control operation in the memory system according to the embodiment.

FIG. 8 is a diagram illustrating an example of the TLP management table that is updated in the memory system according to the embodiment.

DETAILED DESCRIPTION

Figures 2, 3:
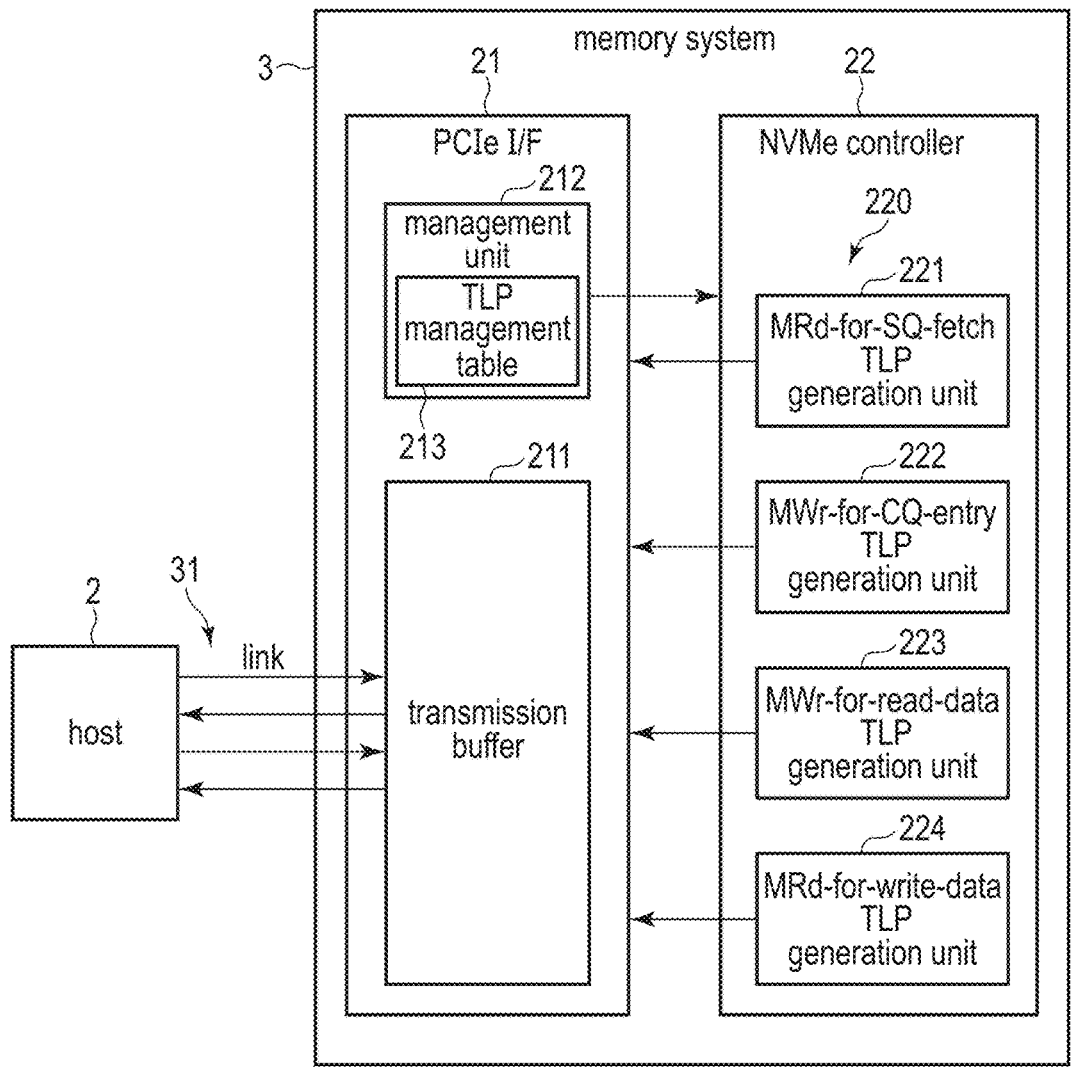
FIG. 2 is a block diagram illustrating an example of a configuration of a PCIe interface and an NVMe controller of the memory system according to the embodiment.
FIG. 3 is a diagram illustrating an example of a configuration of a transaction layer packet (TLP) management table that is used in the memory system according to the embodiment.

Various embodiments will be described hereinafter with reference to the accompanying drawings.

In general, according to one embodiment, a memory system is capable of connecting to a host. The memory system includes a buffer, a nonvolatile memory, and a controller. The buffer is capable of storing packets that are to be transmitted to the host up to a first upper limit number. The controller generates a packet that is related to access to the nonvolatile memory. The controller stores the generated packet in the buffer. The controller transmits, when one or more packets are stored in the buffer, the one or more packets to the host in the order in which the one or more packets have been stored in the buffer. The controller classifies the packets to be transmitted to the host into packets of a first type and packets of a second type. The number of packets of the first type that are allowed to be stored in the buffer is limited to the first upper limit number. The number of packets of the second type that are allowed to be stored in the buffer is limited to a second upper limit number that is smaller than the first upper limit number. In a case where a first packet of the first type is to be generated, when the number of first remaining packets that indicates the number of packets stored in the buffer is smaller than the first upper limit number, the controller generates the first packet of the first type and stores the generated first packet in the buffer, and when the number of first remaining packets is larger than or equal to the first upper limit number, the controller does not generate the first packet or does not store the generated first packet in the buffer. In a case where a second packet of the second type is to be generated, when the number of second remaining packets that indicates the number of packets of the second type that are stored in the buffer is smaller than the second upper limit number, the controller generates the second packet of the second type and stores the generated second packet in the buffer, and when the number of second remaining packets is larger than or equal to the second upper limit number, the controller does not generate the second packet or does not store the generated second packet in the buffer.

First, with reference to FIG. 1, an example of a configuration of an information processing system 1 that includes a memory system according to a first embodiment will be described. The information processing system 1 includes a host device 2 and a memory system 3.

The host device 2 is an information processing device which stores data in the memory system 3. The host device 2 is, for example, a storage server which stores a large amount of various data in the memory system 3, or a personal computer. Hereinafter, the host device 2 is referred to as a host 2.

The memory system 3 is a semiconductor storage device configured to write data to a nonvolatile memory and read data from the nonvolatile memory. The nonvolatile memory is, for example, a NAND flash memory. The memory system 3 is also referred to as a storage device. The memory system 3 is implemented, for example, as a solid state drive (SSD).

The memory system 3 may be used as a storage for the host 2. The memory system 3 is connected to the host 2.

An interface for connecting the host 2 and the memory system 3 conforms to standards such as PCI Express (PCIe) (registered trademark) or NVM Express (NVMe) (registered trademark).

The memory system 3 includes, for example, a NAND flash memory 4, a dynamic random access memory (DRAM) 5, and a controller 6.

The NAND flash memory 4 includes one or more memory chips. Each of the memory chips includes multiple blocks. The blocks each function as a minimum unit of a data erase operation. The block may also be referred to as an erase block or a physical block. Each of the blocks includes multiple pages. Each of the pages includes memory cells connected to a single word line. The pages each function as a unit of a data write operation or a data read operation. Note that a word line may also function as a unit of a data write operation or a data read operation.

The DRAM 5 is a volatile memory. A storage area of the DRAM 5 is allocated, for example, as a storage area of firmware (FW), a cache area of a logical-to-physical address translation table, and a buffer area of user data.

The controller 6 is a memory controller which controls the NAND flash memory 4 and the DRAM 5. The controller 6 is implemented, for example, with a circuit such as a system-on-a-chip (SoC). The controller 6 may include a static random access memory (SRAM) or a DRAM. In this case, the memory system 3 may not include the DRAM 5 that is provided outside the controller 6.

The controller 6 includes, for example, a central processing unit (CPU) 11, a NAND interface (NAND I/F) 12, a DRAM interface (DRAM I/F) 13, and a host interface (host I/F) 14. These CPU 11, NAND I/F 12, DRAM I/F 13, and host I/F 14 may be connected via a bus 10.

The CPU 11 is a processor configured to control the NAND I/F 12, the DRAM I/F 13, and the host I/F 14. The CPU 11 performs various processes by executing the FW loaded from the NAND flash memory 4 onto the DRAM 5.

The FW is a control program including instructions for causing the CPU 11 to execute the various processes. The CPU 11 may perform command processes to execute various commands from the host 2. The operation of the CPU 11 is controlled by the FW executed by the CPU 11.

The NAND I/F 12 electrically connects the controller 6 and the NAND flash memory 4. The NAND I/F 12 conforms to an interface standard such as a toggle double data rate (DDR) or an open NAND flash interface (ONFI).

The NAND I/F 12 functions as a NAND control circuit configured to control the NAND flash memory 4. The NAND I/F 12 may be connected to the respective memory chips in the NAND flash memory 4 via multiple channels (Ch). By operating the memory chips in parallel, it is possible to broaden an access bandwidth between the controller 6 and the NAND flash memory 4.

The DRAM I/F 13 functions as a DRAM control circuit configured to control access to the DRAM 5.

The host I/F 14 is a circuit which functions as an interface that performs communication between the memory system 3 and the host 2. The host I/F 14 includes a circuit for transmitting a packet to the host 2 and a circuit for receiving a packet from the host 2. Each packet is, for example, a packet conforming to the PCIe standard. Each packet includes, for example, a command, a response, or user data. The command is, for example, an input/output (I/O) command or a various control command. The I/O command is, for example, a read command or a write command.

The host I/F 14 includes, for example, a PCIe I/F 21 and an NVMe controller 22.

The PCIe I/F 21 is a circuit which is connected to the host 2 via a serial interface. The serial interface includes a link 31 capable of interconnecting the host 2 and the memory system 3. The PCIe I/F 21 has, for example, a physical connection form which conforms to the PCIe standard. The PCIe I/F 21 performs an interface operation for physically transmitting and receiving data via the link 31. Over the link 31, data is transferred in the form of a packet. Hereinafter, the packet transferred via the link 31 is referred to as a physical packet.

The PCIe I/F 21 further manages the link 31 and performs processes for exchanging data with the NVMe controller 22. More specifically, the PCIe I/F 21 receives a transaction layer packet (TLP) from the NVMe controller 22. The PCIe I/F 21 transmits a physical packet that contains the received TLP to the host 2 via the link 31. Further, the PCIe receives a physical packet from the host 2 via the link 31. The PCIe I/F 21 processes the received physical packet, thereby obtaining a TLP. The PCIe I/F 21 sends the obtained TLP to the NVMe controller 22.

The TLP is a packet of a transaction layer that is defined in the PCIe standard. The TLP is, for example, a packet related to access to the NAND flash memory 4. The TLP includes, for example, either a request or a response (i.e., completion). The TLP may further include user data. To the TLP, a sequence number is assigned. With the sequence number, one corresponding TLP is uniquely identified. Transaction types of TLP that are defined in the PCIe standard include, for example, a memory read request (MRd), a memory write request (MWr), a completion (Cpl), a completion with data (CplD), a configuration read request type 0 and a configuration read request type 1 (CfgRd0 and CfgRd1), and a configuration write request type 0 and a configuration write request type 1 (CfgWr0 and CfgWr1).

In the memory system 3 of this embodiment, types of TLP are defined based on combinations of a transaction type and usage of the TLP. The usage is, for example, transmission of a command, transmission of a completion for a command, or transmission of user data. Hereinafter, the types of TLP based on the combinations of a transaction type and usage are referred to as TLP types. The TLP types include, for example, a memory read request for submission queue (SQ) fetch type (MRd-for-SQ-fetch type), a completion with data for SQ fetch type (CplD-for-SQ-fetch type), a memory write request for completion queue (CQ) entry type (MWr-for-CQ-entry type), a memory write request for read data type (MWr-for-read-data type), a memory read request for write data type (MRd-for-write-data type), a completion with data for write data type (CplD-for-write-data type), and a memory write request for pointer type (MWr-for-pointer type). The TLP types may further include types based on various combinations of a transaction type and usage.

The MRd-for-SQ-fetch type is a type which represents a memory read request for reading a command from a submission queue in the host 2. The submission queue is a queue capable of storing multiple commands. A command that is read from the submission queue is, for example, an I/O command to request access to the NAND flash memory 4.

The CplD-for-SQ-fetch type is a type which represents a completion with data for a TLP of the MRd-for-SQ-fetch type. A TLP of the CplD-for-SQ-fetch type includes a command that has been read from the submission queue in accordance with the TLP of the MRd-for-SQ-fetch type.

The MWr-for-CQ-entry type is a type which represents a memory write request for writing a completion for a command to a completion queue in the host 2. The completion queue is a queue capable of storing multiple completions.

The MWr-for-read-data type is a type which represents a memory write request for writing read data to a memory area in the host 2. The read data is user data that has been read from the NAND flash memory 4 in accordance with a read command.

The MRd-for-write-data type is a type which represents a memory read request for reading write data from a memory area in the host 2. The write data is user data to be written into the NAND flash memory 4 in accordance with a write command.

The CplD-for-write-data type is a type which represents a completion with data for a TLP of the MRd-for-write-data type. A TLP of the CplD-for-write-data type includes user data (that is, write data) that has been read from a memory area in the host 2 in accordance with the TLP of the MRd-for-write-data type.

The MWr-for-pointer type is a type which represents a memory write request for writing a value of one of a SQ tail pointer and a CQ head pointer to a corresponding doorbell register. The SQ Tail pointer indicates a location in the submission queue where a command is to be written. The CQ head pointer indicates a location in the completion queue from which a completion is to be acquired. The respective doorbell registers of the SQ tail pointer and the CQ head pointer are included in the memory system 3.

The PCIe I/F 21 may classify TLPs for each TLP type and process the classified TLPs.

The NVMe controller 22 is a circuit which processes transactions related to access to the NAND flash memory 4. The operation of the NVMe controller 22 conforms to, for example, the NVMe standard. The NVMe controller 22 may classify TLPs for each TLP type and process the classified TLPs.

More specifically, the NVMe controller 22 receives a TLP from the PCIe I/F 21. The TLP type of the TLP received by the NVMe controller 22 is, for example, one of the CplD-for-SQ-fetch type, the CplD-for-write-data type, and the MWr-for-pointer type. The NVMe controller 22 processes a transaction based on a request or a completion according to the received TLP.

Further, when there is a request or a completion to be transmitted to the host 2, the NVMe controller 22 generates a TLP corresponding to the request or the completion. The TLP type of the TLP generated by the NVMe controller 22 is, for example, one of the MRd-for-SQ-fetch type, the MWr-for-CQ-entry type, the MWr-for-read-data type, and the MRd-for-write-data type. The NVMe controller 22 sends the generated TLP to the PCIe I/F 21. The sent TLP is transmitted to the host 2 via the link 31.

Note that the function of each unit in the controller 6 may be realized by dedicated hardware in the controller 6 or may be realized by the CPU 11 executing the FW.

Here, a configuration of the PCIe I/F 21 and the NVMe controller 22 will be described in more detail.

FIG. 2 is a block diagram illustrating an example of the configuration of the PCIe I/F 21 and the NVMe controller 22 in the memory system 3.

The PCIe I/F 21 includes a transmission buffer 211 and a management unit 212.

The transmission buffer 211 is, for example, a volatile memory. A storage area of the transmission buffer 211 is capable of storing multiple TLPs. The storage capacity of the transmission buffer 211 is represented by, for example, an upper limit of the number of TLPs (that is, the number of TLP entries). The upper limit of the number of TLPs that can be stored in the transmission buffer 211 is also referred to as the maximum number of TLPs. Note that the total size of the TLPs that correspond to the maximum number of TLPs may be less than the storage capacity of the transmission buffer 211. In other words, the storage area of the transmission buffer 211 may include an area that is not used to store TLPs.

One or more TLPs stored in the transmission buffer 211 are transmitted to the host 2 via the link 31 in the order in which the TLPs have been stored in the transmission buffer 211. The order of the one or more TLPs that are being stored in the transmission buffer 211 cannot be changed. In other words, the order in which the one or more TLPs stored in the transmission buffer 211 are transmitted to the host 2 cannot be changed.

A TLP stored in the transmission buffer 211 is erased (purged) from the transmission buffer 211 when an acknowledgement (ACK) indicating that the TLP has been successfully received by the host 2 is received after the TLP is transmitted to the host 2. On the other hand, a TLP stored in the transmission buffer 211 is retransmitted to the host 2 when a negative acknowledgement (NAK) indicating that the TLP has not been successfully received by the host 2 is received after the TLP is transmitted to the host 2. Since the transmission buffer 211 enables retransmission of the TLP, transmission of the TLP from the memory system 3 to the host 2 via the link 31 has robustness.

The management unit 212 manages the number of TLPs that are stored in the transmission buffer 211 for each TLP type. The number of TLPs of a certain TLP type that are stored in the transmission buffer 211 is referred to as the number of remaining TLPs of the TLP type. The number of remaining TLPs is increased by one as a TLP of the corresponding TLP type is stored in the transmission buffer 211. The number of remaining TLPs is decreased by one as a TLP of the corresponding TLP type is erased from the transmission buffer 211. The management unit 212 uses, for example, a TLP management table 213 to manage the number of remaining TLPs for each TLP type. An example of a configuration of the TLP management table 213 will be described later with reference to FIG. 3. Further, the management unit 212 notifies the NVMe controller 22 of the number of remaining TLPs for each TLP type.

The NVMe controller 22 includes TLP generation units 220. Each of the TLP generation units 220 corresponds to one TLP type. Each of the TLP generation units 220 generates a TLP of the corresponding TLP type and stores the TLP in the transmission buffer 211. Hereinafter, any one of the TLP generation units 220 may be referred to as a TLP generation unit 220. Further, the TLP type to which the TLP generation unit 220 corresponds is also referred to as a target TLP type.

The TLP generation unit 220 may control generation of a TLP or storage of a TLP in the transmission buffer 211 on the basis of the number of remaining TLPs of the target TLP type and an upper limit number of the target TLP type. The upper limit number corresponding to the target TLP type is an upper limit of the number of TLPs of the target TLP type that are allowed to be stored in the transmission buffer 211. The upper limit number corresponding to the target TLP type is determined, for example, on the basis of a buffer passing data rate. The buffer passing data rate is a data rate that represents a speed at which TLPs pass through the transmission buffer 211. The buffer passing data rate varies according to, for example, a data rate and the maximum payload size (MPS) that are defined in the PCIe standard of a generation (revision) to which the link 31 conforms. For a certain target TLP type, the upper limit number may be set or may not be set. For example, the upper limit number is not set for a TLP type that is related (or is highly related) to access performance to the NAND flash memory 4. For example, the upper limit number is set for a TLP type that is not related (or is less related) to the access performance to the NAND flash memory 4. Further, for example, in a case where many TLPs of the same TLP type are highly likely to be stored in the transmission buffer 211 consecutively, the upper limit number is set for that TLP type.

In a case where the upper limit number is set for the target TLP type, the TLP generation unit 220 can store TLPs of the target TLP type in the transmission buffer 211 until the number of remaining TLPs of the target TLP type reaches the set upper limit number. In more detail, when the number of remaining TLPs is smaller than the upper limit number, the TLP generation unit 220 can generate a TLP of the target TLP type and newly store the TLP in the transmission buffer 211. When the number of remaining TLPs has already reached the upper limit number, the TLP generation unit 220 does not newly generate a TLP of the target TLP type, or does not newly store a TLP of the target TLP type in the transmission buffer 211. Note that even when the number of remaining TLPs is smaller than the upper limit number of the target TLP type, if the total number of TLPs that are stored in the transmission buffer 211 (hereinafter, referred to as the total number of remaining TLPs) has already reached the maximum number of TLPs, the TLP generation unit 220 does not newly generate a TLP of the target TLP type, or does not newly store a TLP of the target TLP type in the transmission buffer 211. The total number of remaining TLPs is, for example, the sum of the respective numbers of remaining TLPs for all the TLP types. Further, when the total number of remaining TLPs is larger than or equal to the upper limit number but the number of remaining TLPs is smaller than the upper limit number, the TLP generation unit 220 can generate a TLP of the target TLP type and newly store the TLP in the transmission buffer 211. That is, even when the total number of remaining TLPs is relatively large, if the number of remaining TLPs of the target TLP type is small, the TLP generation unit 220 can store a TLP of the target TLP type in the transmission buffer 211.

In a case where the upper limit number is not set for the target TLP type, the TLP generation unit 220 can store a TLP of the target TLP type in the transmission buffer 211 until the total number of remaining TLPs reaches the maximum number of TLPs. In more detail, when the total number of remaining TLPs is smaller than the maximum number of TLPs, the TLP generation unit 220 can generate a TLP of the target TLP type and newly store the TLP in the transmission buffer 211. When the total number of remaining TLPs has already reached the maximum number of TLPs, the TLP generation unit 220 does not newly generate a TLP of the target TLP type, or does not newly store a TLP of the target TLP type in the transmission buffer 211.

The TLP generation units 220 will be described with a specific example. The TLP generation units 220 include, for example, an MRd-for-SQ-fetch TLP generation unit 221, an MWr-for-CQ-entry TLP generation unit 222, an MWr-for-read-data TLP generation unit 223, and an MRd-for-write-data TLP generation unit 224.

The MRd-for-SQ-fetch TLP generation unit 221 generates a TLP of the MRd-for-SQ-fetch type. Hereinafter, the TLP of the MRd-for-SQ-fetch type is expressed as an MRd-for-SQ-fetch TLP. The MRd-for-SQ-fetch TLP generation unit 221 stores the generated MRd-for-SQ-fetch TLP in the transmission buffer 211.

For the MRd-for-SQ-fetch type, for example, the upper limit number is not set. In this case, until the total number of remaining TLPs reaches the maximum number of TLPs, the MRd-for-SQ-fetch TLP generation unit 221 can generate an MRd-for-SQ-fetch TLP and newly store the MRd-for-SQ-fetch TLP in the transmission buffer 211. Note that when the total number of remaining TLPs has reached the maximum number of TLPs, the MRd-for-SQ-fetch TLP generation unit 221 does not newly generate an MRd-for-SQ-fetch TLP, or does not newly store a generated MRd-for-SQ-fetch TLP in the transmission buffer 211.

The MWr-for-CQ-entry TLP generation unit 222 generates a TLP of the MWr-for-CQ-entry type. Hereinafter, the TLP of the MWr-for-CQ-entry type is expressed as an MWr-for-CQ-entry TLP. The MWr-for-CQ-entry TLP generation unit 222 stores the generated MWr-for-CQ-entry TLP in the transmission buffer 211.

For the MWr-for-CQ-entry type, for example, the upper limit number is not set. In this case, until the total number of remaining TLPs reaches the maximum number of TLPs, the MWr-for-CQ-entry TLP generation unit 222 can generate an MWr-for-CQ-entry TLP and newly store the MWr-for-CQ-entry TLP in the transmission buffer 211. Note that when the total number of remaining TLPs has reached the maximum number of TLPs, the MWr-for-CQ-entry TLP generation unit 222 does not newly generate an MWr-for-CQ-entry TLP, or does not newly store a generated MWr-for-CQ-entry TLPs in the transmission buffer 211.

The MWr-for-read-data TLP generation unit 223 generates a TLP of the MWr-for-read-data type. Hereinafter, the TLP of the MWr-for-read-data type is expressed as an MWr-for-read-data TLP. The MWr-for-read-data TLP generation unit 223 stores the generated MWr-for-read-data TLP in the transmission buffer 211.

For the MWr-for-read-data type, for example, the upper limit number is set. In this case, until the number of remaining TLPs of the MWr-for-read-data type reaches the set upper limit number, the MWr-for-read-data TLP generation unit 223 can store an MWr-for-read-data TLP in the transmission buffer 211. In more detail, when the number of remaining TLPs of the MWr-for-read-data type is less than the upper limit number of the MWr-for-read-data type, the MWr-for-read-data TLP generation unit 223 can newly store an MWr-for-read-data TLP in the transmission buffer 211. When the number of remaining TLPs of the MWr-for-read-data type has reached the upper limit number of the MWr-for-read-data type, the MWr-for-read-data TLP generation unit 223 does not newly generate an MWr-for-read-data TLP, or does not newly store an MWr-for-read-data TLP in the transmission buffer 211. Note that even in a case where the number of remaining TLPs is smaller than the upper limit number of the MWr-for-read-data type, when the total number of remaining TLPs has reached the maximum number of TLPs, the MWr-for-read-data TLP generation unit 223 does not newly generate an MWr-for-read-data TLP, or does not newly store an MWr-for-read-data TLP in the transmission buffer 211. Further, when the total number of remaining TLPs is larger than or equal to the upper limit number of the MWr-for-read-data type and the number of remaining TLPs is smaller than the upper limit number of the MWr-for-read-data type, the MWr-for-read-data TLP generation unit 223 can generate an MWr-for-read-data TLP and newly store the MWr-for-read-data TLP in the transmission buffer 211.

The MRd-for-write-data TLP generation unit 224 generates a TLP of the MRd-for-write-data type. Hereinafter, the TLP of the MRd-for-write-data is expressed as an MRd-for-write-data TLP. The MRd-for-write-data TLP generation unit 224 stores the generated MRd-for-write-data TLP in the transmission buffer 211.

For the MRd-for-write-data type, for example, the upper limit number is set. In this case, until the number of remaining TLPs of the MRd-for-write-data type reaches the set upper limit number, an MRd-for-write-data TLP can be stored in the transmission buffer 211. In more detail, when the number of remaining TLPs of the MRd-for-write-data type is smaller than the upper limit number of the MRd-for-write-data type, the MRd-for-write-data TLP generation unit 224 can newly store an MRd-for-write-data TLP in the transmission buffer 211. When the number of remaining TLPs of the MRd-for-write-data type has reached the upper limit number of the MRd-for-write-data type, the MRd-for-write-data TLP generation unit 224 does not newly generate an MRd-for-write-data TLP, or does not newly store an MRd-for-write-data TLP in the transmission buffer 211. Note that even in a case where the number of remaining TLPs is smaller than the upper limit number of the MRd-for-write-data type, when the total number of remaining TLPs has reached the maximum number of TLPs, the MRd-for-write-data TLP generation unit 224 does not newly generate an MRd-for-write-data TLP, or does not newly store an MRd-for-write-data TLP in the transmission buffer 211. Further, when the total number of remaining TLPs is larger than or equal to the upper limit number of the MRd-for-write-data type and the number of remaining TLPs is smaller than the upper limit number of the MRd-for-write-data type, the MRd-for-write-data TLP generation unit 224 can generate an MRd-for-write-data TLP and newly store the MRd-for-write-data TLP in the transmission buffer 211.

Next, the TLP management table 213 used by the management unit 212 will be described. FIG. 3 illustrates an example of a configuration of the TLP management table 213. The TLP management table 213 includes one or more entries. Each of the one or more entries corresponds to one TLP type. Each entry includes, for example, a TLP type field, a number of remaining TLPs field, and a sequence number field.

In an entry, the TLP type field indicates a corresponding TLP type. The number of remaining TLPs field indicates the number of remaining TLPs of the corresponding TLP type. The sequence number field indicates a sequence number assigned to a TLP of the corresponding TLP type that is stored in transmission buffer 211. When multiple TLPs of the corresponding TLP type are stored in the transmission buffer 211, the sequence number field indicates multiple sequence numbers that are assigned to these TLPs, respectively.

In the example illustrated in FIG. 3, the TLP management table 213 includes four entries 51, 52, 53, and 54.

The TLP type field of the entry 51 indicates that a TLP type corresponding to the entry 51 is the MRd-for-SQ-fetch type. The number of remaining TLPs field of the entry 51 indicates that the number of remaining TLPs of the MRd-for-SQ-fetch type is zero. Here, since the number of remaining TLPs of the MRd-for-SQ-fetch type is zero, any sequence number of TLP is not set in the sequence number field of the entry 51.

The TLP type field of the entry 52 indicates that a TLP type corresponding to the entry 52 is the MWr-for-CQ-entry type. The number of remaining TLPs field of the entry 52 indicates that the number of remaining TLPs of the MWr-for-CQ-entry type is one. Here, since the number of remaining TLPs of the MWr-for-CQ-entry type is one, a sequence number "0" of the one TLP is set in the sequence number field of the entry 52. In other words, the transmission buffer 211 stores one MWr-for-CQ-entry TLP to which the sequence number "0" is assigned.

The TLP type field of the entry 53 indicates that a TLP type corresponding to the entry 53 is the MWr-for-read-data type. The number of remaining TLPs field of the entry 53 indicates that the number of remaining TLPs of the MWr-for-read-data type is five. Here, since the number of remaining TLPs of the MWr-for-read-data type is five, sequence numbers "1", "2", "3", "4", and "5" of the five TLPs are set in the sequence number field of the entry 53. In other words, the transmission buffer 211 stores five MWr-for-read-data TLPs to which the sequence numbers "1", "2", "3", "4", and "5" are assigned, respectively.

The TLP type field of the entry 54 indicates that a TLP type corresponding to the entry 54 is the MRd-for-write-data type. The number of remaining TLPs field of the entry 54 indicates that the number of remaining TLPs of the MRd-for-write-data type is three. Here, since the number of remaining TLPs of the MRd-for-write-data type is three, sequence numbers "6", "7", and "8" of the three TLPs are set in the sequence number field of the entry 54. In other words, the transmission buffer 211 stores three MRd-for-write-data TLPs to which the sequence numbers "6", "7", and "8" are assigned, respectively.

With use of the TLP management table 213 having such a configuration as discussed above, the management unit 212 can manage the number of remaining TLPs for each TLP type.

The maximum number of TLPs of the transmission buffer 211 included in the memory system 3 is designed, for example, on the basis of the maximum data rate defined in the PCIe standard of a generation to which the memory system 3 conforms. When the link 31 operates at a data rate lower than the maximum data rate of the generation to which the memory system 3 conforms, the maximum number of TLPs of the transmission buffer 211 becomes excessive with respect to the lower data rate. For example, if a rate at which TLPs are stored in the transmission buffer 211 is constant (for example, at a rate according to the maximum data rate defined in the PCIe standard of the generation to which the memory system 3 conforms) regardless of the data rate at which the link 31 operates, TLPs tend to remain in the transmission buffer 211 since there is a difference between the rate at which TLPs are stored in the transmission buffer 211 and the lower data rate at which the link 31 actually operates. Thus, for example, an excessive number of TLPs remain in the transmission buffer 211.

A time period in which a certain TLP is stored in the transmission buffer 211 is referred to as a buffer duration of the TLP. The buffer duration of a TLP includes, as an overhead, a time period that elapses before other TLPs are transmitted to the host 2, which other TLPs have already been stored in the transmission buffer 211 when the TLP is stored in the transmission buffer 211. Therefore, the buffer duration of a TLP may be longer depending on the number of TLPs already stored in the transmission buffer 211 when the TLP is stored in the transmission buffer 211. Therefore, if the maximum number of TLPs of the transmission buffer 211 is excessive with respect to the data rate at which the link 31 actually operates, the buffer duration of a TLP may be long.

Figure 4:
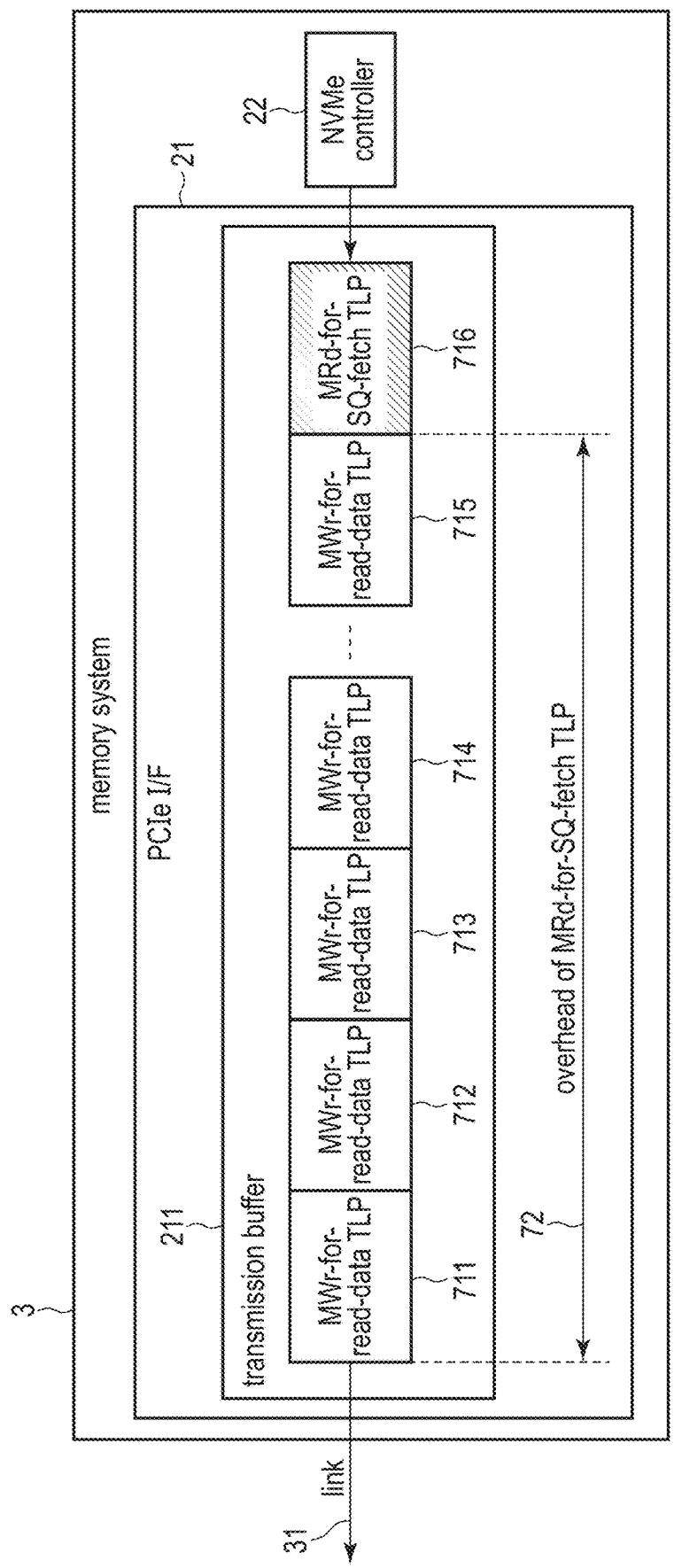
FIG. 4 is a diagram illustrating an example of an overhead of a TLP to be transmitted to a host from the memory system according to the embodiment.
Figure 6:
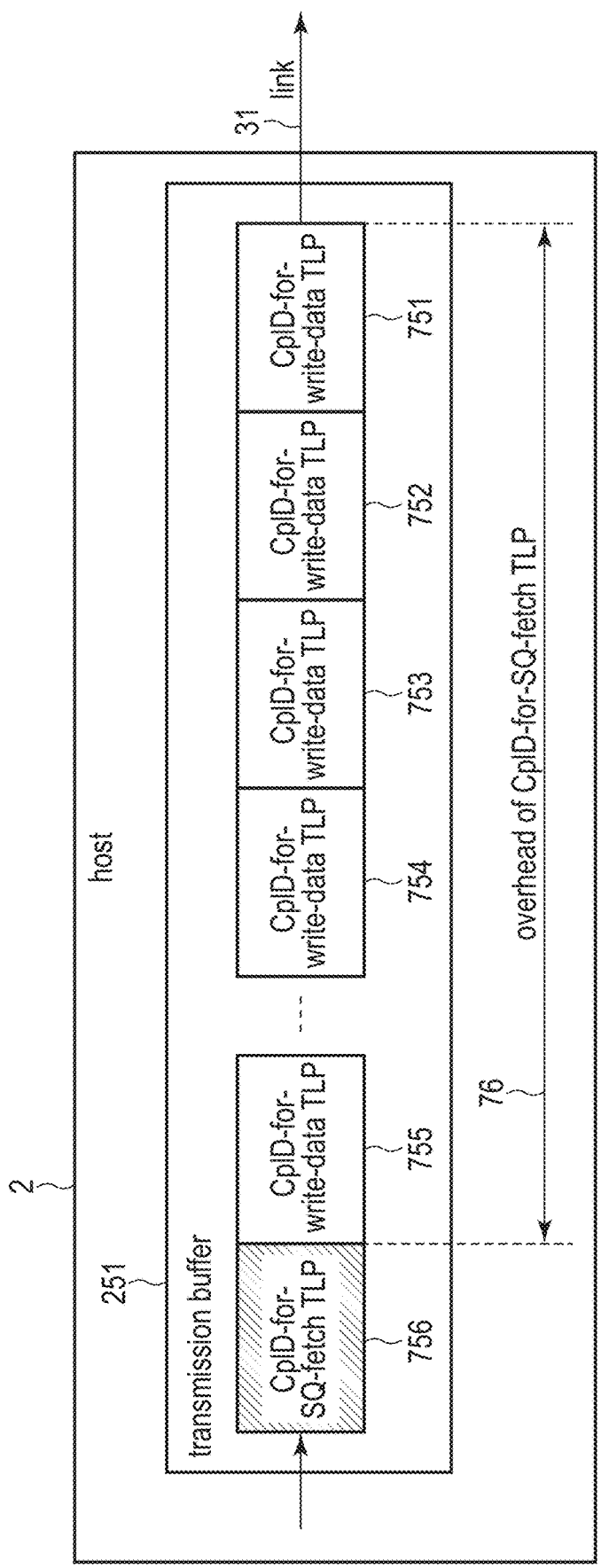
FIG. 6 is a diagram illustrating an example of an overhead of a TLP to be transmitted from the host to the memory system according to the embodiment.

With reference to FIGS. 4 to 6, an overhead which occurs when TLPs are transmitted via the link 31 will be described.

FIG. 4 illustrates an example of an overhead of a TLP that is transmitted from the memory system 3 to the host 2. Here, it is assumed that the NVMe controller 22 stores, in the transmission buffer 211, multiple MWr-for-read-data TLPs 711, 712, 713, 714, . . . , 715, and an MRd-for-SQ-fetch TLP 716 in this order.

The PCIe I/F 21 transmits the MWr-for-read-data TLPs 711, 712, 713, 714, . . . , 715, and the MRd-for-SQ-fetch TLP 716 to the host 2 via the link 31 in the order in which these TLPs have been stored in the transmission buffer 211. Thus, the MRd-for-SQ-fetch TLP 716 is transmitted after all the MWr-for-read-data TLPs 711, 712, 713, 714, . . . , 715 have been transmitted. Therefore, the time period required to transmit the MWr-for-read-data TLPs 711, 712, 713, 714, . . . , 715 becomes an overhead 72 incurred when the MRd-for-SQ-fetch TLP 716 is transmitted.

As the overhead 72 is greater, the time period that elapses before the memory system 3 acquires a command corresponding to the MRd-for-SQ-fetch TLP 716 from the host 2 is delayed more. In that case, in the memory system 3, the number of commands acquired from the host 2 in a unit period of time decreases. If, for example, the number of read commands for the NAND flash memory 4 is thus decreased, read performance for the NAND flash memory 4 may be degraded.

As described above, the increase in the time period during which the MRd-for-SQ-fetch TLP 716 is stored in the transmission buffer 211 (buffer duration) because of the overhead 72 causes degradation in the access performance to the NAND flash memory 4.

FIG. 5 illustrates another example of an overhead of a TLP that is transmitted from the memory system 3 to the host 2. Here, it is assumed that the NVMe controller 22 stores, in the transmission buffer 211, multiple MRd-for-write-data TLPs 731, 732, 733, 734, . . . , 735 and an MRd-for-SQ-fetch TLP 736 in this order.

The PCIe I/F 21 transmits the MRd-for-write-data TLPs 731, 732, 733, 734, . . . , 735 and the MRd-for-SQ-fetch TLP 736 to the host 2 via the link 31 in the order in which these TLPs have been stored in the transmission buffer 211. Thus, the MRd-for-SQ-fetch TLP 736 is transmitted after all the MRd-for-write-data TLPs 731, 732, 733, 734, . . . , 735 have been transmitted. Therefore, the time period required to transmit the MRd-for-write-data TLPs 731, 732, 733, 734, . . . , 735 becomes an overhead 74 incurred when the MRd-for-SQ-fetch TLP 736 is transmitted.

As the overhead 74 is greater, the time period that elapses before the memory system 3 acquires a command corresponding to the MRd-for-SQ-fetch TLP 736 from the host 2 is delayed more. In that case, in the memory system 3, the number of commands acquired from the host 2 in a unit period of time decreases. If, for example, the number of read commands for the NAND flash memory 4 is thus decreased, read performance for the NAND flash memory 4 may be degraded.

As described above, the increase in the time period during which the MRd-for-SQ-fetch TLP 736 is stored in the transmission buffer 211 because of the overhead 74 causes degradation in the access performance to the NAND flash memory 4.

FIG. 6 illustrates an example of an overhead of a TLP that is transmitted from the host 2 to the memory system 3. As in the case of the transmission buffer 211 included in the memory system 3, a transmission buffer 251 is included in the host 2 as well. Here, it is assumed that multiple CplD-for-write-data TLPs 751, 752, 753, 754, . . . , 755 and a CplD-for-SQ-fetch TLP 756 are stored in the transmission buffer 251 in this order.

The CplD-for-write-data TLP is a TLP which responds to an MRd-for-write-data TLP received from the memory system 3. The CplD-for-write-data TLP contains write data that is read from a storage area in the host 2.

The CplD-for-SQ-fetch TLP is a TLP which responds to an MRd-for-SQ-fetch TLP received from the memory system 3. The CplD-for-SQ-fetch TLP contains a command that is acquired from the submission queue in the host 2.

The host 2 transmits the CplD-for-write-data TLPs 751, 752, 753, 754, . . . , 755 and the CplD-for-SQ-fetch TLP 756 in the transmission buffer 251 to the memory system 3 via the link 31 in the order in which these TLPs have been stored in the transmission buffer 251. Therefore, the CplD-for-SQ-fetch TLP 756 is transmitted after all the CplD-for-write-data TLPs 751, 752, 753, 754, . . . , 755 have been transmitted. Thus, the time period required to transmit the CplD-for-write-data TLPs 751, 752, 753, 754, . . . , 755 becomes an overhead 76 incurred when the CplD-for-SQ-fetch TLP 756 is transmitted.

As the overhead 76 is greater, the time period that elapses before the memory system 3 acquires a command contained in the CplD-for-SQ-fetch TLP 756 from the host 2 is delayed more. In that case, in the memory system 3, the number of commands acquired from the host 2 in a unit period of time decreases. If, for example, the number of read commands for the NAND flash memory 4 is thus decreased, read performance for the NAND flash memory 4 may be degraded.

As described above, the increase in the time period during which the CplD-for-SQ-fetch TLP 756 is stored in the transmission buffer 251 because of the overhead 76 causes degradation in the access performance to the NAND flash memory 4.

The memory system 3 of this embodiment is configured to be able to set the upper limit number of TLPs stored in the transmission buffer 211 for each TLP type. The upper limit number is smaller than the maximum number of TLPs of the transmission buffer 211. When the upper limit number is set for a particular TLP type, the number of TLPs of the particular TLP type that are stored in the transmission buffer 211 is limited to smaller than or equal to the upper limit number, in the memory system 3. In this manner, an overhead incurred when a TLP is transmitted to the host 2 using the transmission buffer 211 can be reduced. As the overhead is reduced more, the time period to acquire a response to the TLP from the host 2 becomes shorter. Further, the number of commands acquired from the host 2 in a unit period of time may be increased. Therefore, as compared to a case where the upper limit number is not set, in the memory system 3, for example, the number of commands that request access to the NAND flash memory 4 and are acquired from the host 2 per unit period of time can be increased, and thus access performance to the NAND flash memory 4 can be improved.

FIG. 7 is a sequence diagram illustrating an example of a TLP storage control operation in the memory system 3. The TLP storage control operation is performed, for example, when the TLP generation unit 220 is to generate a new TLP. Here, it is assumed that the upper limit number is set for the TLP type corresponding to the TLP generation unit 220 (i.e., target TLP type), and the total number of remaining TLPs has not reached the maximum number of TLPs.

First, the management unit 212 notifies the number of remaining TLPs of the target TLP type to the TLP generation unit 220 by using the TLP management table 213 (A1). The management unit 212 may notify the number of remaining TLPs of the target TLP type to the TLP generation unit 220 in response to a change in the number of remaining TLPs before the TLP storage control operation is started. Alternatively, the management unit 212 may notify the number of remaining TLPs of the target TLP type to the TLP generation unit 220 in response to a request by the TLP generation unit 220.

Next, the TLP generation unit 220 determines whether or not the notified number of remaining TLPs is smaller than the upper limit number (A2).

When the notified number of remaining TLPs is smaller than the upper limit number, the TLP generation unit 220 generates a new TLP (A3). The TLP generation unit 220 stores the generated TLP in the transmission buffer 211 (A4). The management unit 212 detects that the TLP generation unit 220 has stored the TLP in the transmission buffer 211 (A5). Then, the management unit 212 updates an entry of the TLP management table 213 that corresponds to the target TLP type (A6). More specifically, the management unit 212 adds one to the number of remaining TLPs in the entry. Further, the management unit 212 adds the sequence number of the stored TLP to the sequence number field of the entry. The management unit 212 may further notify the increased number of remaining TLPs to the TLP generation unit 220 (A7).

Thus, the management unit 212 updates the number of remaining TLPs each time a new TLP is stored in the transmission buffer 211 while the number of remaining TLPs is smaller than the upper limit number. In this manner, the management unit 212 can correctly manage the number of remaining TLPs.

In contrast, when the notified number of remaining TLPs is larger than or equal to the upper limit number, the TLP storage control operation is terminated. In other words, since the number of remaining TLPs has reached the upper limit number, the TLP generation unit 220 does not generate a new TLP. As a result, the number of TLPs of the target TLP type that are stored in the transmission buffer 211 does not exceed the upper limit number.

With the TLP storage control operation described above, the memory system 3 can correctly manage the number of remaining TLPs and perform control so that the number of TLPs of the target TLP type stored in the transmission buffer 211 does not exceed the upper limit number. Note that in a case where the upper limit number is not set for the target TLP type, only the operations A3 to A6 are performed, for example.

FIG. 8 illustrates an example of the TLP management table 213 that is updated by the TLP storage control operation illustrated in FIG. 7. Here, a case is illustrated where the management unit 212 updates the TLP management table 213 illustrated in FIG. 3 when the MRd-for-SQ-fetch TLP generation unit 221 generates a new TLP and stores the TLP in the transmission buffer 211.

In this case, the management unit 212 adds one to the number of remaining TLPs in the entry 51 that corresponds to the MRd-for-SQ-fetch type. In other words, in the entry 51, the number of remaining TLPs of the MRd-for-SQ-fetch type is updated from zero to one.

Further, the management unit 212 adds a sequence number "9" that is assigned to the newly stored MRd-for-SQ-fetch TLP, to the sequence number field of the entry 51. In other words, the entry 51 is updated to indicate that the transmission buffer 211 stores the MRd-for-SQ-fetch TLP to which the sequence number "9" is assigned.

Thus, the management unit 212 can manage the transmission buffer 211 storing the one MRd-for-SQ-fetch TLP.

Figures 9, 10:
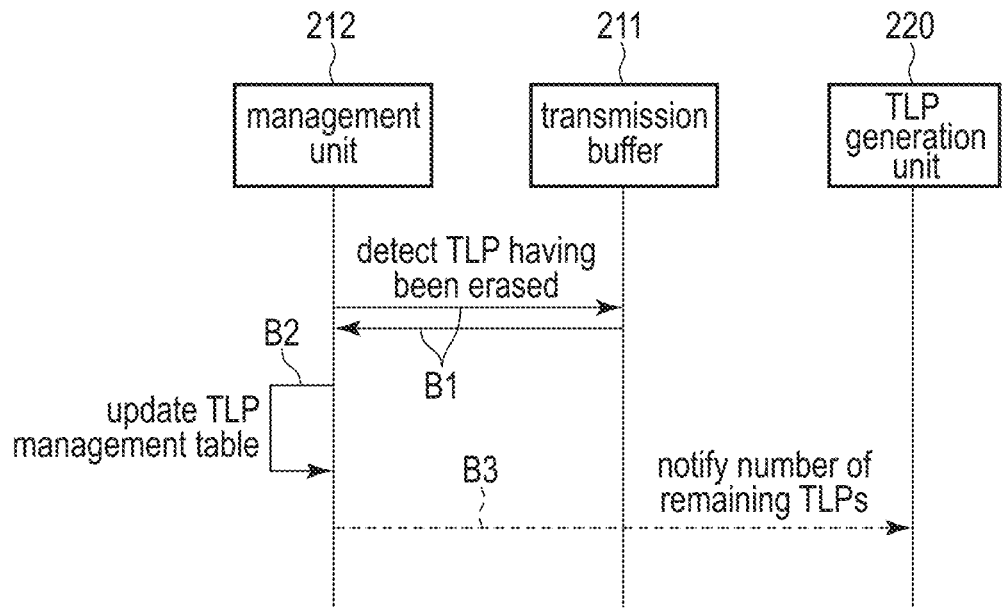
FIG. 9 is a sequence diagram illustrating an example of a TLP erase control operation in the memory system according to the embodiment.
FIG. 10 is a diagram illustrating another example of the TLP management table that is updated in the memory system according to the embodiment.

FIG. 9 is a sequence diagram illustrating an example of a TLP erase control operation in the memory system 3. The TLP erase control operation is performed when an ACK to a TLP transmitted from the memory system 3 to the host 2 has been received from the host 2. The ACK contains the sequence number of a corresponding TLP. The PCIe I/F 21 uses the sequence number contained in the ACK to identify the TLP corresponding to the ACK. The PCIe I/F 21 erases the identified TLP from the transmission buffer 211.

The management unit 212 detects that the TLP has been erased from the transmission buffer 211 (B1). Then, the management unit 212 updates an entry of the TLP management table 213 that corresponds to the TLP type of the erased TLP (B2). More specifically, the management unit 212 subtracts one from the number of remaining TLPs in the entry. In addition, the management unit 212 deletes the sequence number of the erased TLP from the sequence number field of the entry. The management unit 212 may further notify the reduced number of remaining TLPs to the TLP generation unit 220 (B3).

In this manner, the management unit 212 updates the number of remaining TLPs each time a TLP is erased from the transmission buffer 211. Thus, the management unit 212 can correctly manage the number of remaining TLPs.

FIG. 10 illustrates an example of the TLP management table 213 updated by the TLP erase control operation illustrated in FIG. 9. Here, a case is illustrated where the management unit 212 updates the TLP management table 213 illustrated in FIG. 8 when an ACK is received from the host 2 and then an MWr-for-CQ-entry TLP corresponding to the ACK is erased from the transmission buffer 211.

In this case, the management unit 212 subtracts one from the number of remaining TLPs in the entry 52 that corresponds to the MWr-for-CQ-entry type. In other words, in the entry 52, the number of remaining TLPs of the MWr-for-CQ-entry type is updated from one to zero.

Further, the management unit 212 deletes a sequence number "0" assigned to the deleted MWr-for-CQ-entry TLP from the sequence number field of the entry 52. In other words, the entry 52 is updated so that the entry 52 does not indicate the MWr-for-CQ-entry TLP to which the sequence number "0" is assigned, which has been erased from transmission buffer 211.

Thus, the management unit 212 can manage the transmission buffer 211 that does not store any MWr-for-CQ-entry TLPs.

Figure 11:
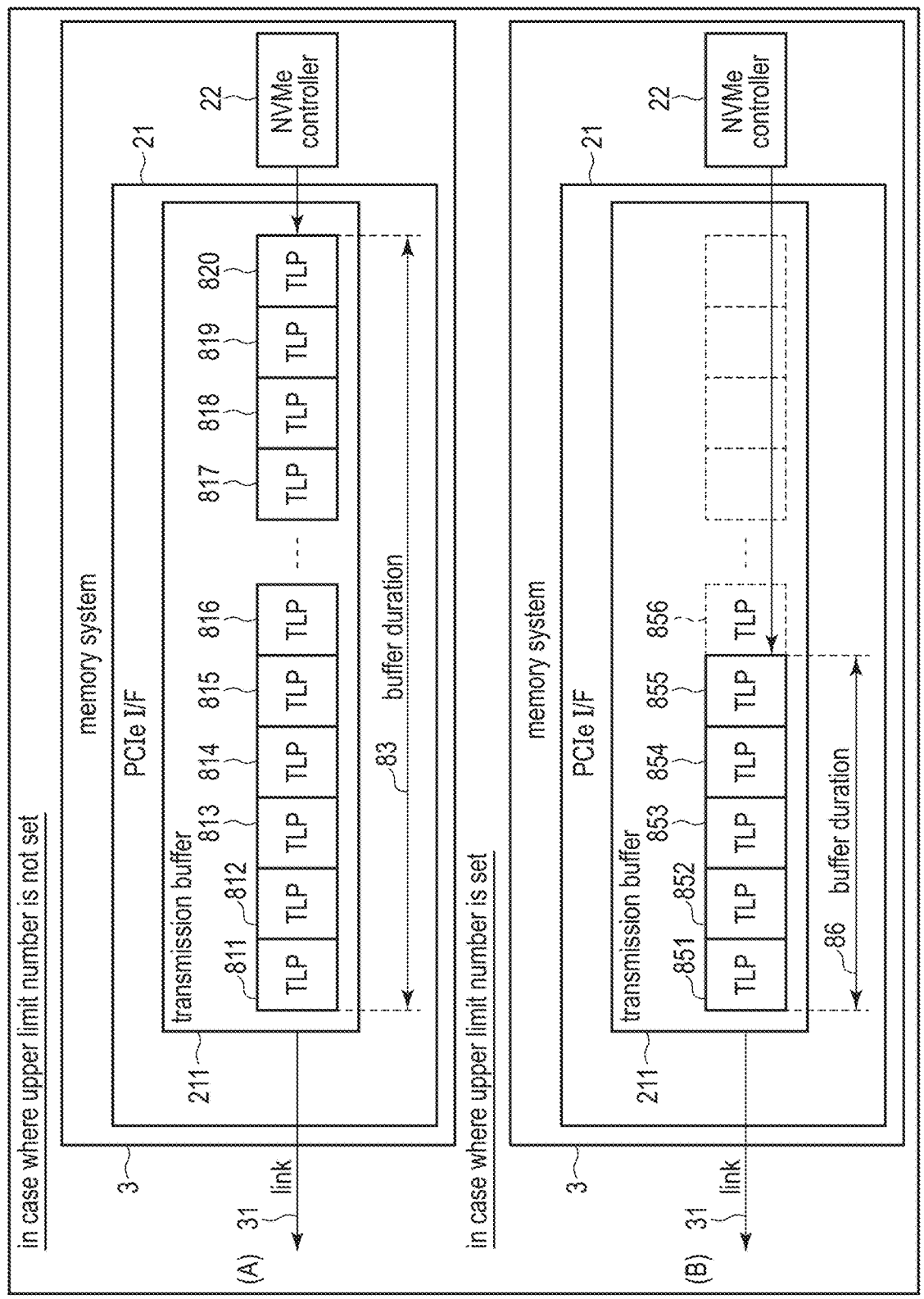
FIG. 11 is a diagram illustrating (A) an example of buffer duration in a case where an upper limit number is not set, and (B) an example of buffer duration in a case where the upper limit number is set, in the memory system according to the embodiment.

Here, a difference in buffer duration depending on whether the upper limit number is set or not will be described. FIG. 11 illustrates: (A) an example of buffer duration in a case where the upper limit number is not set; and (B) an example of buffer duration in a case where the upper limit number is set, in the memory system 3.

In a case where the upper limit number is not set, the NVMe controller 22 (more specifically, the TLP generation unit 220) can store a TLP in the transmission buffer 211 up to the maximum number of TLPs of the transmission buffer 211. TLPs stored in the transmission buffer 211 are transmitted to the host 2 via the link 31 in the order in which the TLPs have been stored in the transmission buffer 211.

For example, as illustrated in FIG. 11(A), it is assumed a case where the NVMe controller 22 stores TLPs 811 to 820 sequentially in the transmission buffer 211 up to the maximum number of TLPs of the transmission buffer 211. The PCIe I/F 21 transmits the TLPs 811 to 820 to the host 2 via the link 31 in the order in which the TLPs have been stored. Therefore, the TLP 820 stored last is transmitted after all the previously stored TLPs 811 to 819 have been transmitted.

A time period in which a TLP is stored in the transmission buffer 211 (buffer duration) includes a time period that elapses before other TLPs are transmitted to the host 2, which other TLPs have already been stored in the transmission buffer 211 when the TLP is stored in the transmission buffer 211. Therefore, the buffer duration of a TLP may be longer depending on the number of TLPs already stored in the transmission buffer 211 when the TLP is stored in the transmission buffer 211. For example, a buffer duration 83 of the last stored TLP 820 includes a time period that elapses before the TLPs 811 to 819 already stored in the transmission buffer 211 when the TLP 820 is stored in the transmission buffer 211 are transmitted to the host 2. As the buffer duration 83 is longer, a response to the TLP 820 by the host 2 is delayed more. Therefore, for example, in a case where the TLP 820 is an MRd-for-SQ-fetch TLP, a time period from when the NVMe controller 22 stores the TLP 820 in the transmission buffer 211 until when a command contained in a response to the TLP 820 from the host 2 is acquired lengthens.

In contrast, when the upper limit number is set, the NVMe controller 22 can store a TLP of a certain TLP type in the transmission buffer 211 up to the upper limit number set for the TLP type.

For example, as illustrated in FIG. 11(B), it is assumed that a case where the NVMe controller 22 stores TLPs 851 to 855 in the transmission buffer 211 in this order. Here, the TLPs 851 to 855 are TLPs of a specific TLP type. Further, the upper limit number set for the specific TLP type is five.

The PCIe I/F 21 transmits the TLPs 851 to 855 in the order in which the TLPs have been stored, to the host 2 via the link 31. Therefore, the TLP 855 stored last is transmitted after all the previously stored TLPs 851 to 854 have been transmitted. A buffer duration 86 of the last stored TLP 855 includes the time period that elapses before the TLPs 851 to 854 already stored in the transmission buffer 211 when the TLP 855 is stored are transmitted to the host 2. Since the number of TLPs of the specific TLP type stored in the transmission buffer 211 at the same time is limited to smaller than or equal to the upper limit number, the buffer duration 86 is shorter than the buffer duration 83 of the case where the upper limit number is not set as illustrated in FIG. 11(A) (more specifically, the case where TLPs of the maximum number of the transmission buffer 211 are stored). Therefore, for example, in a case where an MRd-for-SQ-fetch TLP 856 is stored in the transmission buffer 211 after the TLP 855, a time period from when the NVMe controller 22 stored the TLP 856 in the transmission buffer 211 until when a command contained in a response to the TLP 856 from the host 2 is acquired may be shortened as compared to the case where the upper limit number is not set.

Figures 12, 13:
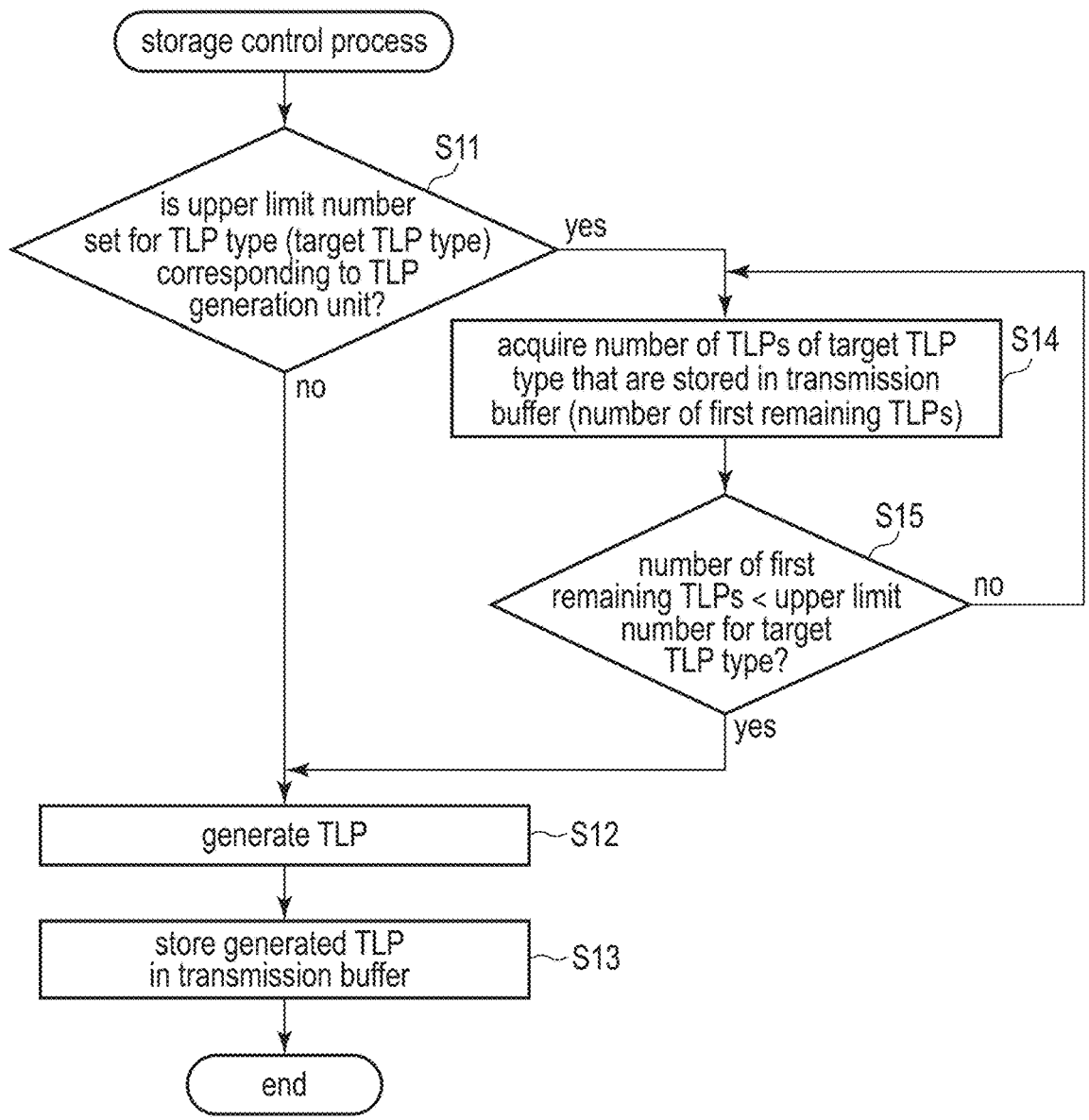
FIG. 12 is a diagram illustrating an example of a data rate that represents a speed at which TLPs pass through a transmission buffer in the memory system according to the embodiment.
FIG. 13 is a flowchart illustrating an example of the procedure of a storage control process executed in the memory system according to the embodiment.

FIG. 12 illustrates an example of a data rate representing a speed at which TLPs pass through the transmission buffer 211 (buffer passing data rate). The data rate representing a speed at which TLPs pass through the transmission buffer 211 varies depending on, for example, the data rate and the MPS that are defined in the PCIe standard of the generation to which the link 31 conforms.

In a case where the link 31 operates at a data rate defined in the PCIe Gen 2 and the MPS is 256 bytes, the buffer passing data rate is, for example, 1.83 GB/s. In a case where the link 31 operates at the data rate defined in the PCIe Gen 2 and the MPS is 1 Kbyte, the buffer passing data rate is, for example, 1.95 GB/s.

In a case where the link 31 operates at a data rate defined in the PCIe Gen 4 and the MPS is 256 bytes, the buffer passing data rate is, for example, 7.20 GB/s. In a case where the link 31 operates at the data rate defined in the PCIe Gen 4 and the MPS is 1 Kbyte, the buffer passing data rate is, for example, 7.70 GB/s.

In a case where the link 31 operates at a data rate defined in the PCIe Gen 5 and the MPS is 256 bytes, the buffer passing data rate is, for example, 14.40 GB/s. In a case where the link 31 operates at the data rate defined in the PCIe Gen 5 and the MPS is 1 Kbyte, the buffer passing data rate is, for example, 15.39 GB/s.

As described above, the buffer passing data rate of the case where the link 31 operates at the data rate defined in the PCIe Gen 4 is approximately four times higher than the buffer passing data rate of the case where the link 31 operates at the data rate defined in the PCIe Gen 2. Further, the buffer passing data rate of the case where the link 31 operates at the data rate defined in the PCIe Gen 5 is approximately eight times higher than the buffer passing data rate of the case where the link 31 operates at the data rate defined in the PCIe Gen 2.

The maximum number of TLPs of the transmission buffer 211 is determined on the basis of, for example, the maximum data rate assumed in the memory system 3. The maximum data rate assumed in the memory system 3 is the maximum data rate defined in the PCIe standard of the generation to which the memory system 3 conforms. When the link 31 operates at a data rate that is lower than the maximum data rate assumed in the memory system 3, the maximum number of TLPs of the transmission buffer 211 is excessive for the lower data rate. In other words, an excessive number of TLPs tend to remain in the transmission buffer 211. Thus, the buffer duration for each TLP lengthens.

In the memory system 3 of this embodiment, as illustrated in FIG. 11(B), the upper limit number of TLPs of a particular TLP type that are allowed to be stored in the transmission buffer 211 is set. The upper limit number is determined on the basis of, for example, the buffer passing data rate. When the data rate of the link 31 is lower than the maximum data rate assumed in memory system 3, the upper limit number is set to be smaller than the maximum number of TLPs of the transmission buffer 211. Accordingly, the TLP generation unit 22 corresponding to the TLP type to which the upper limit number is set, stores a TLP in the transmission buffer 211 while the number of remaining TLPs of the TLP type does not exceed the upper limit number. In this manner, it is possible to reduce the overhead incurred when a TLP is transmitted to the host 2 by using the transmission buffer 211. As the overhead is reduced more, the time period that elapses before a response to the TLP is acquired from the host 2 is shortened. Then, for example, the number of commands acquired from the host 2 in a unit period of time may increase. Therefore, as compared to the case where the upper limit number is not set, in the memory system 3, for example, the number of commands that request access to the NAND flash memory 4 and are acquired from the host 2 in the unit period of time is increased, and thus the access performance to the NAND flash memory 4 can be improved.

As an example, it is assumed a case where the maximum number of TLPs of the transmission buffer 211 is 128. This maximum number of TLPs is based on a design in which the link 31 is assumed to operate at the data rate defined in the PCIe Gen 5. In a case where the link 31 operates at the data rate defined in the PCIe Gen 5, a time period for outflowing one TLP from the transmission buffer 221 (a transmission buffer outflow time) is, for example, 0.2 microseconds (μs). In a case where the link 31 operates at a data rate defined in the PCIe Gen 2, the transmission buffer outflow time is, for example, 1.6 μs. The transmission buffer outflow time is an average time period from when a TLP becomes a target for transmission in the transmission buffer 211 until the transmission of the TLP to the host 2 is completed. A TLP becomes a target for transmission when all TLPs already stored in the transmission buffer 211 when the TLP is stored have been transmitted to the host 2.

In this case, when the link 31 operates at the data rate defined in the PCIe Gen 5 as assumed, the buffer duration is 25.6 μs (=0.2 μs×128) at maximum.

Now, two cases are considered. One is a case where the link 31 actually operates at the data rate defined in the PCIe Gen 2 and the upper limit number is not set. The other is a case where the link 31 actually operates at the data rate defined in the PCIe Gen 2 and the upper limit number is set.

When the link 31 actually operates at the data rate defined in the PCIe Gen 2 and the upper limit number is not set, the buffer duration is 204.8 μs (=1.6 μs×128) at maximum. Thus, the maximum value of the buffer duration with the PCIe Gen 2 is approximately 10 times longer than the buffer duration with the PCIe Gen 5.

In contrast, when the link 31 actually operates at the data rate defined in the PCIe Gen 2 and the upper limit number is set to 16, the buffer duration is 25.6 μs (=1.6 μs×16) at maximum. Thus, by setting the upper limit number to 16, even when the link 31 operates at the data rate defined in the PCIe Gen 2, the maximum value of the buffer duration can be shortened to 25.6 μs as in the case where the link 31 operates at the data rate defined in the PCIe Gen 5.

Next, processes executed in the memory system 3 will be described with reference to FIGS. 13 to 15.

FIG. 13 is a flowchart illustrating an example of the procedure of a storage control process that is executed by the TLP generation unit 220 of the NVMe controller 22. The storage control process is a process which controls storage of a TLP in the transmission buffer 211. When a TLP of a TLP type that corresponds to the TLP generation unit 220 (i.e., a TLP of a target TLP type) is to be generated, the TLP generation unit 220 executes the storage control process. Here, it is assumed that the transmission buffer 211 has a free space available to store a TLP (that is, the total number of remaining TLPs has not reached the maximum number of TLPs).

First, the TLP generation unit 220 determines whether or not an upper limit number is set for the target TLP type (step S11). The upper limit number for the target TLP type is an upper limit of the number of TLPs of the target TLP type that are allowed to be stored in the transmission buffer 211.

When the upper limit number is not set for the target TLP type (no in step S11), the TLP generation unit 220 generates a TLP (that is, a TLP of the target TLP type) (step S12). Then, the TLP generation unit 220 stores the generated TLP in the transmission buffer 211 (step S13) and ends the storage control process.

In contrast, when the upper limit number is set for the target TLP type (yes in step S11), the TLP generation unit 220 acquires the number of TLPs of the target TLP type stored in the transmission buffer 211 (the number of first remaining TLPs) (step S14). The number of first remaining TLPs is, for example, notified to the TLP generation unit 220 by the management unit 212. The TLP generation unit 220 may request the management unit 212 to notify the number of first remaining TLPs. The TLP generation unit 220 determines whether or not the acquired number of first remaining TLPs is smaller than the upper limit number for the target TLP type (step S15).

When the number of first remaining TLPs is larger than or equal to the upper limit number for the target TLP type (no in step S15), the process by the TLP generation unit 220 returns to step S14. That is, while the number of TLPs of the target TLP type that remain in the transmission buffer 211 reaches the upper limit number for the target TLP type, the TLP generation unit 220 operates so as to wait to newly store a TLP of the target TLP type in the transmission buffer 211.

When the number of first remaining TLPs is smaller than the upper limit number for the target TLP type (yes in step S15), the TLP generation unit 220 generates a TLP (step S12). The TLP generation unit 220 then stores the generated TLP in the transmission buffer 211 (step S13) and ends the storage control process.

With the storage control process described above, the TLP generation unit 220 can store a TLP of the target TLP type in the transmission buffer 211 when the upper limit number for the target TLP type is not set or when the number of the first remaining TLPs is smaller than the upper limit number for the target TLP type. Further, the TLP generation unit 220 can perform control so as not to newly store a TLP of the target TLP type in the transmission buffer 211 when the number of first remaining TLPs is larger than or equal to the upper limit number for the target TLP type.

Figure 14:
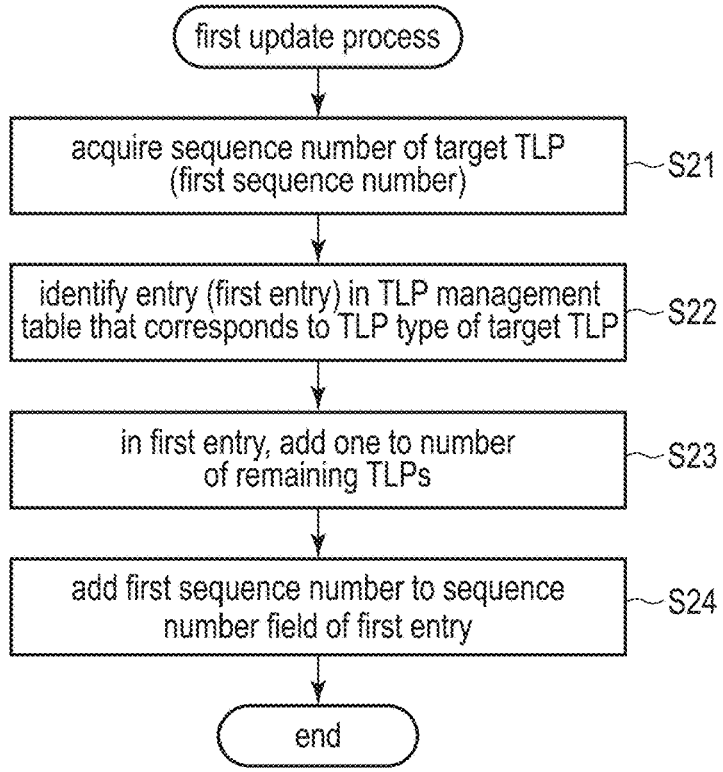
FIG. 14 is a flowchart illustrating an example of the procedure of a first update process executed in the memory system according to the embodiment.

FIG. 14 is a flowchart illustrating an example of the procedure of a first update process that is executed by the management unit 212 of the PCIe I/F 21. The first update process is a process to update the TLP management table 213 in accordance with a TLP that is newly stored in the transmission buffer 211. The management unit 212 executes the first update process, for example, when a TLP has been newly stored in the transmission buffer 211. Hereinafter, the TLP newly stored in the transmission buffer 211 is referred to as a target TLP.

First, the management unit 212 obtains a sequence number of the target TLP (hereinafter, referred to as a first sequence number) (step S21). The management unit 212 identifies an entry in the TLP management table 213 that corresponds to the TLP type of the target TLP (hereinafter, referred to as a first entry) (step S22). The management unit 212 identifies the TLP type of the target TLP, for example, based on which one of the TLP generation units 220 has stored the target TLP in the transmission buffer 211. Alternatively, to the target TLP, information indicating the corresponding TLP type may be appended.

Next, the management unit 212 adds one to the number of remaining TLPs in the first entry (step S23). Then, the management unit 212 adds the first sequence number to the sequence number field of the first entry (step S24), and ends the first update process.

With the first update process described above, when a TLP has been stored in the transmission buffer 211, the management unit 212 can increment by one the number of remaining TLPs that is associated with the TLP type of the TLP. Further, the management unit 212 can manage the transmission buffer 211 storing the TLP by using the sequence number.

Figure 15:
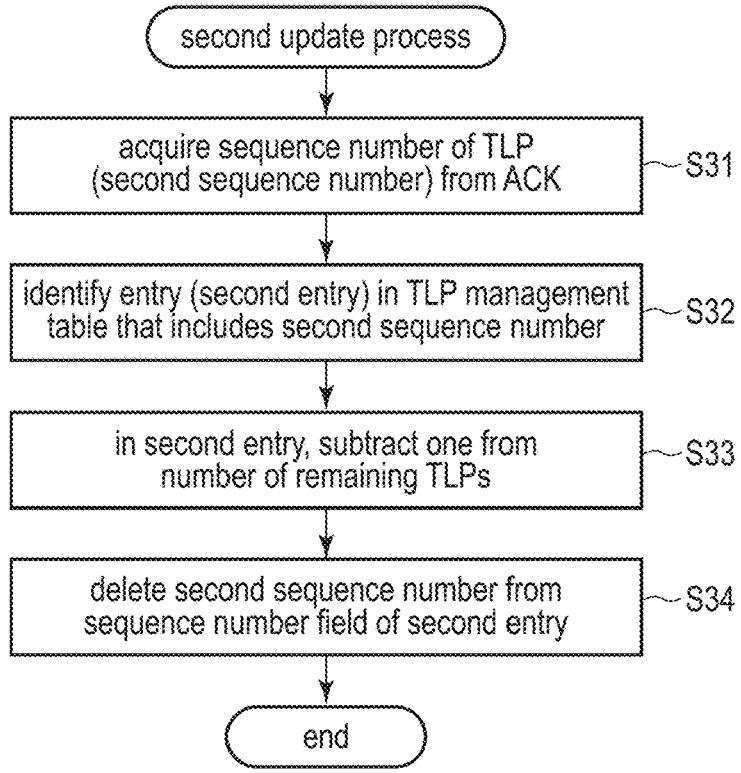
FIG. 15 is a flowchart illustrating an example of the procedure of a second update process executed in the memory system according to the embodiment.

FIG. 15 is a flowchart illustrating an example of the procedure of a second update process that is executed by the management unit 212 of the PCIe I/F 21. The second update process is a process to update the TLP management table 213 in accordance with a TLP that is erased from the transmission buffer 211. A TLP is erased from the transmission buffer 211 when a corresponding ACK has been received from the host 2. The management unit 212 executes the second update process, for example, when the TLP has been erased from the transmission buffer 211.

First, the management unit 212 obtains a sequence number of the TLP (hereinafter, referred to as a second sequence number) from the ACK received from the host 2 (step S31). The management unit 212 identifies an entry in the TLP management table 213 that includes the second sequence number (hereinafter, referred to as a second entry) (step S32). That is, the identified second entry includes a sequence number field which indicates at least the second sequence number.

Next, the management unit 212 subtracts one from the number of remaining TLPs in the second entry (step S33). Then, the management unit 212 deletes the second sequence number from the sequence number field of the second entry (step S34) and ends the second update process.

With the second update process described above, when a TLP has been erased from the transmission buffer 211, the management unit 212 can decrease by one the number of remaining TLPs that is associated with the TLP type of the TLP. Further, the management unit 212 can delete the second sequence number from the TLP management table 213 (more specifically, the second entry) to end management of the erased TLP.

As described above, according to the embodiment, the access performance to the nonvolatile memory can be improved. The transmission buffer 211 is capable of storing packets (for example, TLPs) to be transmitted to the host 2 up to a first upper limit number. The NVMe controller 22 (more specifically, the TLP generation unit 220) generates a packet related to access to the NAND flash memory 4 and stores the generated packet in the transmission buffer 211. The PCIe I/F 21 transmits, when one or more packets are stored in the transmission buffer 211, the one or more packets to the host 2 in the order in which the packets have been stored in the transmission buffer 211. The NVMe controller 22 or the PCIe I/F 21 classifies the packets to be transmitted to the host 2 into packets of a first type and packets of a second type. The number of packets of the first type that are allowed to be stored in the transmission buffer 211 is limited to the first upper limit number. The number of packets of the second type that are allowed to be stored in the transmission buffer 211 is limited to a second upper limit number that is less than the first upper limit number. In a case where a first packet of the first type is to be generated, the NVMe controller 22 generates the first packet of the first type and stores the generated first packet in the transmission buffer 211 when the number of first remaining packets indicating the number of packets stored in the transmission buffer 211 is smaller than the first upper limit number, and does not generate the first packet or does not store the generated first packet in the transmission buffer 211 when the number of first remaining packets is larger than or equal to the first upper limit number. In a case where a second packet of the second type is to be generated, the NVMe controller 22 generates the second packet of the second type and stores the generated second packet in the transmission buffer 211 when the number of second remaining packets indicating the number of packets of the second type stored in the transmission buffer 211 is smaller than the second upper limit number, and does not generate the second packet or does not store the generated second packet in the transmission buffer 211 when the number of second remaining packets is larger than or equal to the second upper limit number.

With the configuration describes above, the number of packets of the second type stored in the transmission buffer 211 is limited to be smaller than or equal to the second upper limit number. Thus, the overhead incurred when a packet is transmitted to the host 2 by using the transmission buffer 211 can be reduced. The overhead is reduced more, the time period required to obtain a response to the packet from the host 2 can be shortened more. Accordingly, the number of commands obtained from the host 2 in a unit period of time may be increased. Therefore, compared to a case where the upper limit number is not set, in the memory system 3, for example, the number of commands that request access to the NAND flash memory 4 and are acquired from the host 2 in the unit period of time can be increased, and thus the access performance to the NAND flash memory 4 can be improved.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system capable of connecting to a host, the memory system comprising:
 a buffer capable of storing packets that are to be transmitted to the host;
 a nonvolatile memory; and a controller configured to:
  generate a plurality of packets each of which is related to access to the nonvolatile memory;
  classify the plurality of packets into packets of a first type and packets of a second type;
  store the packets of the first type and the packets of the second type mixed in the buffer; and
  transmit one or more packets from the buffer to the host in the order in which the one or more packets have been stored in the buffer, wherein
the controller is further configured to:
manage a first upper limit number and a second upper limit number that is smaller than the first upper limit number;
in a case where a first packet of the first type is to be generated,
  when the number of first remaining packets that indicates a total of the number of packets of the first type stored in the buffer and the number of packets of the second type stored in the buffer is smaller than the first upper limit number, generate the first packet and store the generated first packet in the buffer, and
  when the number of first remaining packets is larger than or equal to the first upper limit number, determine not to generate the first packet or not to store the generated first packet in the buffer; and
in a case where a second packet of the second type is to be generated,
  when the number of first remaining packets is smaller than the first upper limit number and the number of second remaining packets that indicates the number of packets of only the second type stored in the buffer is smaller than the second upper limit number, generate the second packet and store the generated second packet in the buffer, and
  when the number of first remaining packets is smaller than the first upper limit number but the number of second remaining packets is larger than or equal to the second upper limit number, determine not to generate the second packet or not to store the generated second packet in the buffer.

2. The memory system according to claim 1, wherein
the first type is either a first memory read request type for reading a command from a memory of the host or a first memory write request type for writing a completion to the memory of the host, and
the second type is either a second memory write request type for writing, to the memory of the host, data read from the nonvolatile memory or a second memory read request type for reading, from the memory of the host, data to be written into the nonvolatile memory.

3. The memory system according to claim 1, wherein
the controller is configured to
when the number of first remaining packets is larger than or equal to the second upper limit number but the number of second remaining packets is smaller than the second upper limit number, generate the second packet and store the generated second packet in the buffer.

4. The memory system according to claim 1, wherein
the controller is further configured to:
  add one to the number of second remaining packets in response to a packet of the second type having been stored in the buffer; and
  subtract one from the number of second remaining packets in response to a packet of the second type having been erased from the buffer.

5. The memory system according to claim 1, wherein
the second upper limit number is determined based on a data rate that represents a rate at which the packets to be transmitted to the host pass through the buffer.

6. The memory system according to claim 1, wherein
the controller includes the buffer.

7. The memory system according to claim 1, wherein
a sum of sizes of packets of the first upper limit number is less than a storage capacity of the buffer.

8. The memory system according to claim 1, wherein
the nonvolatile memory is a NAND flash memory.

9. The memory system according to claim 1, wherein
the memory system is capable of connecting to the host via a serial interface which conforms to a PCI Express standard.

10. A method of controlling transmission of packets using a buffer, the buffer being capable of storing packets that are to be transmitted to a host, said method comprising:
  generating a plurality of packets each of which is related to access to a nonvolatile memory;
  classifying the plurality of packets into packets of a first type and packets of a second type;
  storing the packets of the first type and the packets of the second type mixed in the buffer; and
  transmitting one or more packets from the buffer to the host in the order in which the one or more packets have been stored in the buffer, wherein
the method further comprises:
managing a first upper limit number and a second upper limit number that is smaller than the first upper limit number;
in a case where a first packet of the first type is to be generated,
  when the number of first remaining packets that indicates a total of the number of packets of the first type stored in the buffer and the number of packets of the second type stored in the buffer is smaller than the first upper limit number, generating the first packet and storing the generated first packet in the buffer, and
  when the number of first remaining packets is larger than or equal to the first upper limit number, determining not to generate the first packet or not to store the generated first packet in the buffer; and
in a case where a second packet of the second type is to be generated,
  when the number of first remaining packets is smaller than the first upper limit number and the number of second remaining packets that indicates the number of packets of only the second type stored in the buffer is smaller than the second upper limit number, generating the second packet and storing the generated second packet in the buffer, and
  when the number of first remaining packets is smaller than the first upper limit number but the number of second remaining packets is larger than or equal to the second upper limit number, determining not to generate the second packet or not to store the generated second packet in the buffer.

11. The method according to claim 10, wherein
the first type is either a first memory read request type for reading a command from a memory of the host or a first memory write request type for writing a completion to the memory of the host, and
the second type is either a second memory write request type for writing, to the memory of the host, data read from the nonvolatile memory or a second memory read request type for reading, from the memory of the host, data to be written into the nonvolatile memory.

12. The method according to claim 10, wherein
when the number of first remaining packets is larger than or equal to the second upper limit number but the number of second remaining packets is smaller than the second upper limit number, the second packet is generated and stored in the buffer.

13. The method according to claim 10, further comprising:
adding one to the number of second remaining packets in response to a packet of the second type having been stored in the buffer; and
subtracting one from the number of second remaining packets in response to a packet of the second type having been erased from the buffer.

14. The method according to claim 10, wherein
the second upper limit number is determined based on a data rate that represents a rate at which the packets to be transmitted to the host pass through the buffer.

15. The method according to claim 10, wherein
the method is executed by a controller that includes the buffer.

16. The method according to claim 10, wherein
a sum of sizes of packets of the first upper limit number is less than a storage capacity of the buffer.

17. The method according to claim 10, wherein
the nonvolatile memory is a NAND flash memory.

18. The method according to claim 10, further comprising:
communicating with the host via a serial interface which conforms to a PCI Express standard.

* * * * *